Oct. 15, 1929.　　　J. LINDAHL　　　1,732,130

DETACHABLE PAIL FUNNEL

Filed March 12, 1928　　　2 Sheets-Sheet 1

John Lindahl, INVENTOR

BY Victor J. Evans ATTORNEY

Oct. 15, 1929.   J. LINDAHL   1,732,130
DETACHABLE PAIL FUNNEL
Filed March 12, 1928   2 Sheets-Sheet 2
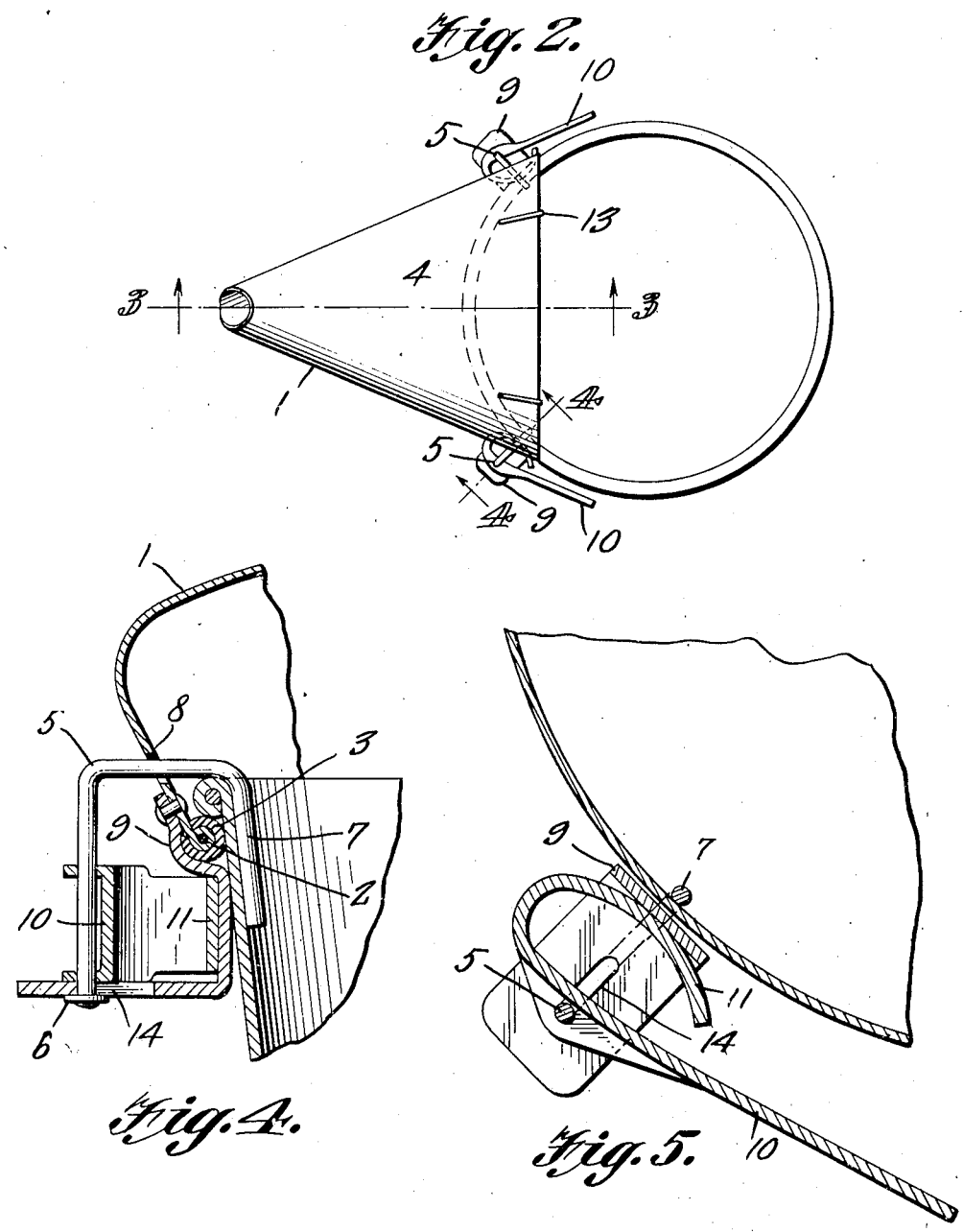
John Lindahl,
INVENTOR
BY Victor J. Evans
ATTORNEY Patented Oct. 15, 1929

1,732,130

UNITED STATES PATENT OFFICE

JOHN LINDAHL, OF QUINAULT, WASHINGTON

DETACHABLE PAIL FUNNEL

Application filed March 12, 1928. Serial No. 261,028.

This invention relates to detachable spouts for pails, tubs or the like to decant liquids containing insoluble matters and comprises a funnel of water-proof material of hollow flattened taper form with a curved lower edge to conform to the shape of the pail outside of which is a vulcanized rubber hinge to form a water-tight seal adapted to be clamped securely to the pail's side. The funnel may be made of any desired material of a water-proof character for which sheet tin may be advantageously employed. By the means described the device may be readily applied or detached from a circular vessel by the quick release of a pair of spring clips and when properly cleaned the device may be instantly restored for use.

The invention therefore essentially consists of an arched funnel having a vulcanized rubber seal at its lower edge and a pair of spring clamps to lock it securely on the sides of a pail. It embodies also other more specific features, the novelty of which will be hereinafter described and will be definitely indicated in the appended claims.

In the accompanying drawings:

Fig. 2 is a plan;

Fig. 4 is a vertical section on the plane 4—4 of Fig. 2; and

Fig. 5 is a horizontal section through a cap.

Figure 1:
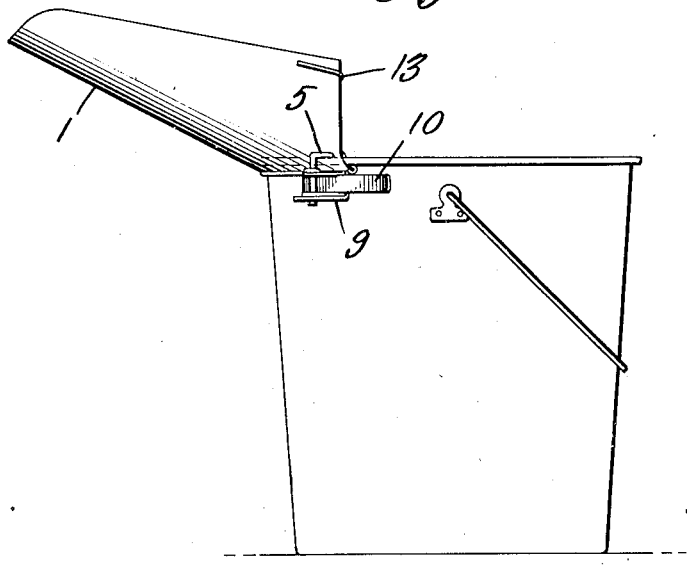
Figure 1 is an elevation of the device as applied to a pail.
Figure 3:
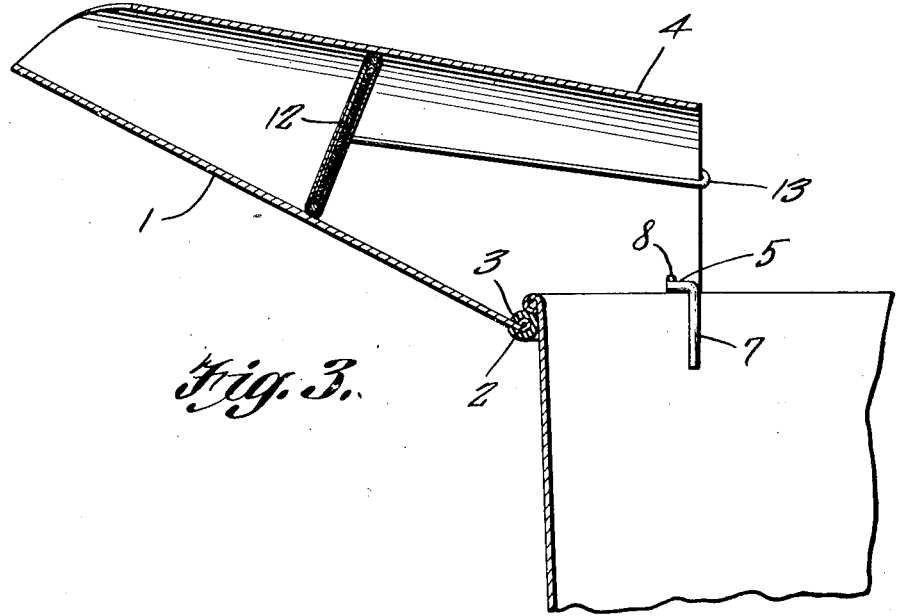
Fig. 3 is a vertical section on the plane 3—3 of Fig. 2.

Referring now in particular to the drawings, 1 represents a taper spout forming a flattened cone the bottom edge of which overlaps the pail's side. The bottom edge of the flattened cone has a curled edge containing a stiffening wire 2, over which is applied a slitted vulcanized rubber gasket cemented or vulcanized fast to the bottom edge of the spout. The bottom edge is of an arched form to conform to the circular curvature of the pail or other vessel and the rubber tube 3 when brought in alignment with the curled edge of the pail forms a water-tight seal to prevent the escape of liquid poured from the pail. The upper side of the spout as indicated at 4 overlaps the side of a pail and a detachable strainer 12 formed of metal gauze carries a hooked spring arm 13 to form a support and spacer for the strainer. The lower side of the funnel is perforated as indicated at 8 to admit a post of wire 5 having an angular bend at 7 to lie flush with the side of the pail. A riveted or soldered support 9 is supported so as to be pendant adjacent to the side of the pail and has a right-angular bend in which is formed a slot 14 to guide the rear side of the post 5. A washer 6 anchors the post in the side walls of the slot. A spring 10 having a cam face 11 is pivoted on the post 5 and the cam edge 11 bears against the angular pendant metallic strip 9 and firmly locks the pin 5 to the pail thus compressing the rubber gasket and affording a seal against the escape of liquid when being poured from the pail. By swinging the levers 10 outwardly the funnel may be detached from the side of the pail and by swinging the outer ends toward the pail the cam edge 11 forces the post outward in the slot 14 and clamps the prong 7 into a tight engagement with the pail, simultaneously compressing the rubber gasket and the seal thereby rendering the seal tight against drip when decanting the liquid from the pail. When the operation is concluded, the sieve is removed and may be washed out in running water and replaced without detaching the funnel thus keeping it sanitary.

Having thus described my invention, what I claim as new and desire to secure by Letters Patent, is:—

1. A detachable funnel for pails comprising a flattened funnel having an arched lower edge, a split vulcanized gasket covering the edge, hooked clamps overlapping the pail, sheet metal slotted supports for the clamps and pivoted cams to clamp the funnel.

2. A detachable strainer for pails comprising a flattened funnel having an arched lower edge, a split vulcanized gasket covering the edge, a hooked clamp overlapping the pail, dependent supports attached to the funnel for the clamps, and pivoted cams to clamp the funnel watertight.

In testimony whereof I affix my signature.

JOHN LINDAHL.